US011792516B1

(12) United States Patent
Patel et al.

(10) Patent No.: US 11,792,516 B1
(45) Date of Patent: Oct. 17, 2023

(54) FLEX CIRCUIT ARRANGEMENTS FOR CAMERA WITH SENSOR SHIFT ACTUATION

(71) Applicant: Apple Inc., Cupertino, CA (US)

(72) Inventors: Himesh Patel, Fremont, CA (US); Kai Min, San Jose, CA (US); Phillip R. Sommer, Newark, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/675,666

(22) Filed: Feb. 18, 2022

Related U.S. Application Data

(60) Provisional application No. 63/248,371, filed on Sep. 24, 2021, provisional application No. 63/151,011, filed on Feb. 18, 2021.

(51) Int. Cl.
*H04N 23/68* (2023.01)
*H02K 11/02* (2016.01)
*H02K 41/035* (2006.01)
*H04N 23/54* (2023.01)
*H04N 23/55* (2023.01)

(52) U.S. Cl.
CPC .......... *H04N 23/687* (2023.01); *H02K 11/02* (2013.01); *H02K 41/0356* (2013.01); *H04N 23/54* (2023.01); *H04N 23/55* (2023.01)

(58) Field of Classification Search
CPC ...... H04N 23/687; H04N 23/54; H04N 23/55; H02K 11/02; H02K 41/0356
See application file for complete search history.

(56) References Cited

U.S. PATENT DOCUMENTS

| 7,679,647 | B2* | 3/2010 | Stavely | G03B 17/02 |
| | | | | 348/208.99 |
| 9,609,219 | B2 | 3/2017 | Howarth et al. | |
| 10,670,878 | B2 | 6/2020 | Miller et al. | |
| 2018/0191957 | A1* | 7/2018 | Miller | G02B 27/646 |
| 2019/0020822 | A1* | 1/2019 | Sharma | H04N 23/57 |
| 2019/0141248 | A1* | 5/2019 | Hubert | G02B 7/08 |
| 2020/0314338 | A1* | 10/2020 | Johnson | H04N 23/68 |

FOREIGN PATENT DOCUMENTS

WO 2007083082 A1 7/2007

* cited by examiner

*Primary Examiner* — Padma Haliyur
(74) *Attorney, Agent, or Firm* — Robert C. Kowert; Kowert, Hood, Munyon, Rankin & Goetzel, P.C.

(57) ABSTRACT

Various embodiments include flex circuit arrangements for a camera with sensor shift actuation. Some embodiments include a flexure-circuit hybrid structure. Some embodiments include an actuation-module flex circuit hybrid structure. In some embodiments, the hybrid structures may include different portions that share multiple layers of a plurality of stacked layers. In some embodiments, one portion of a hybrid structure may include one or more layers that are different from the layers in another portion of the hybrid structure.

20 Claims, 11 Drawing Sheets

FLEX CIRCUIT ARRANGEMENTS FOR CAMERA WITH SENSOR SHIFT ACTUATION

This application claims benefit of priority to U.S. Provisional Application Ser. No. 63/151,011, filed Feb. 18, 2021, and claims benefit of priority to U.S. Provisional Application Ser. No. 63/248,371, filed Sep. 24, 2021, which are hereby incorporated by reference herein in their entirety.

BACKGROUND

Technical Field

This disclosure relates generally to flex circuit arrangements for a camera with sensor shift actuation.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

Figure 1:
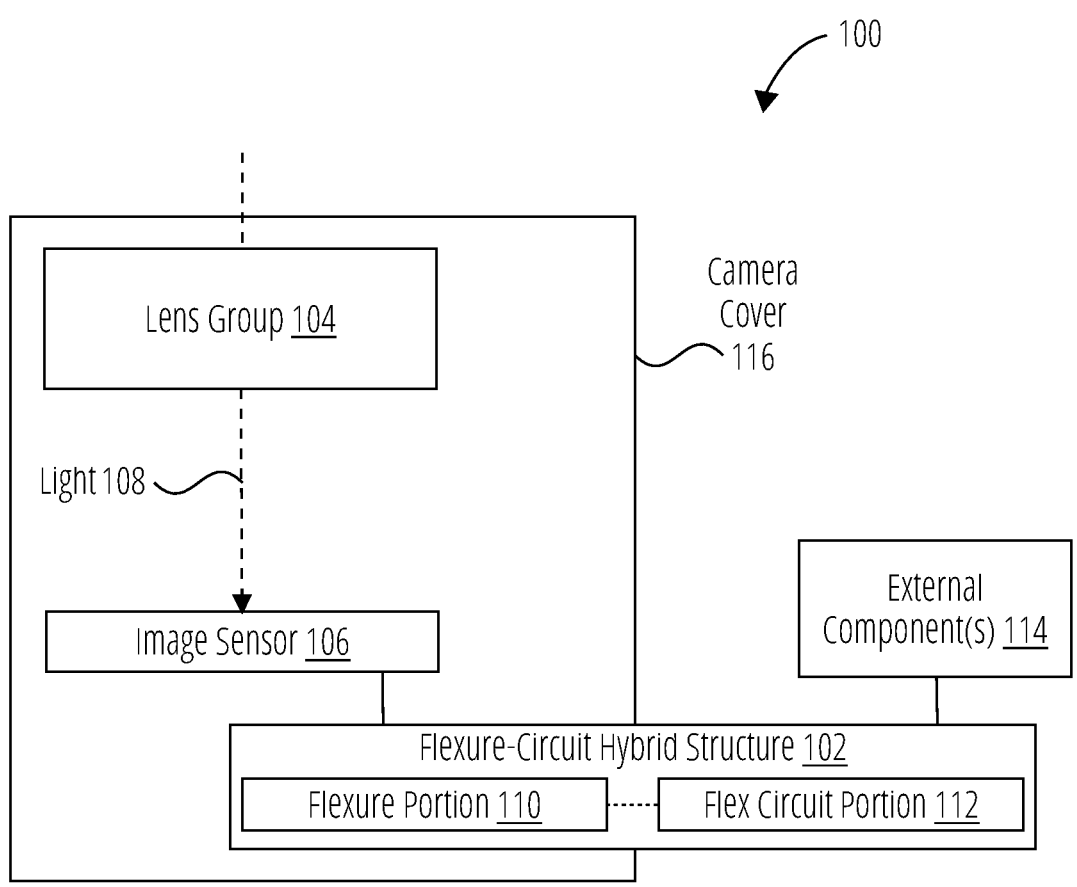
FIG. 1 illustrates a schematic block diagram of an example camera system that may include a flexure-circuit hybrid structure for a camera with sensor shift actuation, in accordance with some embodiments.

This specification includes references to "one embodiment" or "an embodiment." The appearances of the phrases "In one embodiment" or "In an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments include flex circuit arrangements for a camera with sensor shift actuation. Some embodiments include a flexure-circuit hybrid structure. Some embodiments include an actuation-module flex circuit hybrid structure. In some embodiments, the hybrid structures may include different portions that share multiple layers of a plurality of stacked layers. In some embodiments, one portion of a hybrid structure may include one or more layers that are different from the layers in another portion of the hybrid structure.

Some embodiments include a flexure-circuit hybrid structure for a camera with sensor shift actuation. As compared to some other systems that include a flexure and a flex circuit that are separately formed components (and that are bonded together, e.g., using an ACF bonding process), the flexure-circuit hybrid structure described herein may instead be a single component that functions as both a flexure and a flex circuit. The flexure-circuit hybrid structure may include layers that are stacked in a first direction (e.g., orthogonal to an image plane defined by an image sensor of the camera). In various embodiments, such layers may include a flexure portion and a flex circuit portion. The flexure portion may be configured to suspend the image sensor from a stationary structure of the camera and/or to allow motion of the image sensor enabled by one or more actuators of the camera. The flex circuit portion may be configured to convey electrical signals between the flexure portion and one or more external components that are external to the camera. In some embodiments, the flex circuit portion may extend from the flexure portion in a second direction that is parallel to the image plane. For example, the flex circuit portion may extend in the second direction towards the external component(s), which may include, for example, a main logic board of a camera system (and/or a device that includes the camera system).

In some embodiments, the flexure-circuit hybrid structure may be formed in a component-level process that eliminates one or more assembly processes (e.g., an ACF bonding process), reduces the supply chain, and/or improves the manufacturing process involved with respect to a camera with sensor shift actuation. In some embodiments, by eliminating one or more discontinuities (e.g., an impedance discontinuity that would otherwise be present due to ACF bonding a flexure to a flex circuit), the flexure-circuit hybrid structure may enable relatively higher data transfer rates, improved power delivery, and/or improved thermal performance in some embodiments.

Some embodiments include an actuation-module flex circuit hybrid structure for a camera with sensor shift actuation. As compared to some other systems that include an actuation flex circuit and a module flex circuit that are separately formed components (and that are bonded together, e.g., using an ACF bonding process), the actuation-module flex circuit hybrid structure described herein may instead be a single component that functions as both an actuation flex circuit and a module flex circuit.

In some embodiments, the actuation-module flex circuit hybrid structure may be formed in a component-level process that eliminates one or more assembly processes (e.g., an ACF bonding process), reduces the supply chain, and/or improves the manufacturing process involved with respect to a camera with sensor shift actuation. In some embodiments, by eliminating one or more discontinuities (e.g., an impedance discontinuity that would otherwise be present due to ACF bonding one flex circuit to another flex circuit), the actuation-module flex circuit hybrid structure may enable relatively higher data transfer rates, improved power delivery, and/or improved thermal performance in some embodiments.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

FIG. 1 illustrates a schematic block diagram of an example camera system 100 that may include a flexure-circuit hybrid structure 102 for a camera with sensor shift actuation. According to various embodiments, the camera system 100 may further include a lens group 104, an image sensor 106, and one or more actuators (e.g., voice coil motor (VCM) actuator(s), as discussed herein with reference to FIGS. 2A-2B). The lens group 104 may include one or more lens elements that define an optical axis. Additionally, or alternatively, the camera may have an optical axis that is orthogonal to an image plane defined by the image sensor 106. The image sensor 106 may receive light 108 that has passed through the lens group 104 and/or one or more other lens elements of the camera. Furthermore, the image sensor 106 may be configured to convert the captured light 108 to image signals.

In various embodiments, the actuator(s) may be configured to move the image sensor 106 (hence the reference herein to "sensor shift actuation") and/or the lens group 104. For example, the actuator(s) may be used to move the image sensor 106 relative to the lens group 104 to provide autofocus (AF) and/or optical image stabilization (OIS) functionality. Additionally, or alternatively, the actuator(s) may be used to move the lens group 104 relative to the image sensor 106 to provide AF and/or OIS functionality.

According to various embodiments, the flexure-circuit hybrid structure 102 may function as both a flexure and a flex circuit. As compared to some other systems (e.g., a system with a flexure and a flex circuit that are separately formed components and that are bonded together), the flexure-circuit hybrid structure 102 described herein may be a single component in various embodiments. The flexure-circuit hybrid structure 102 may include layers that are stacked in a first direction that is orthogonal to the image plane defined by the image sensor 106, e.g., as also described herein with reference to FIG. 3A. In various embodiments, such layers may include a flexure portion 110 and a flex circuit portion 112. The flexure portion 110 may be configured to suspend the image sensor 106 from a stationary structure of the camera and/or to allow motion of the image sensor 106 enabled by the actuator(s). The flex circuit portion 112 may be configured to convey electrical signals between the flexure portion 110 and one or more external components 114 that are external to the camera. Some of the stacked layers may be shared by the flexure portion 110 and the flex circuit portion 112. In some embodiments, the flex circuit portion 112 may extend from the flexure portion 110 in a second direction that is parallel to the image plane. For example, the flex circuit portion 112 may extend in the second direction towards the external component(s) 114, which may include, for example, a main logic board of the camera system 100 (and/or a device that includes the camera system 100.

In some embodiments, the camera system 100 may include a camera cover 116 that encases at least a portion of the camera. According to some non-limiting examples, the camera cover 116 may comprise a shield can. Furthermore, in some embodiments the camera cover 116 may delimit, at least in part, a boundary between interior component(s) (e.g., lens group 104, image sensor 106, etc.) of the camera and one or more external components (e.g., external component(s) 114).

Figure 2A:
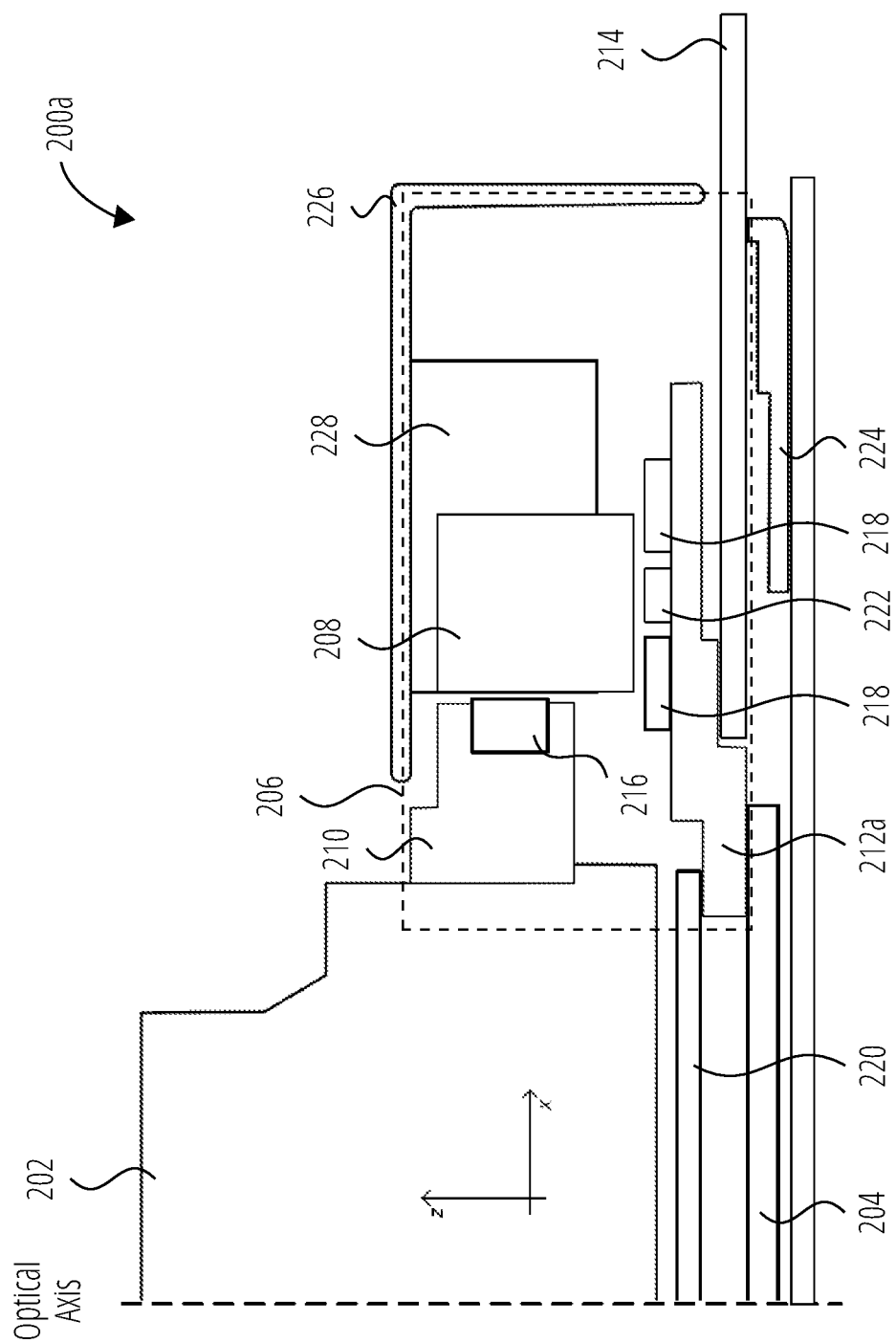
FIG. 2A illustrates a schematic cross-sectional side view of an example camera that may include a flexure-circuit hybrid structure that enables sensor shift actuation, in accordance with some embodiments.
Figure 2B:
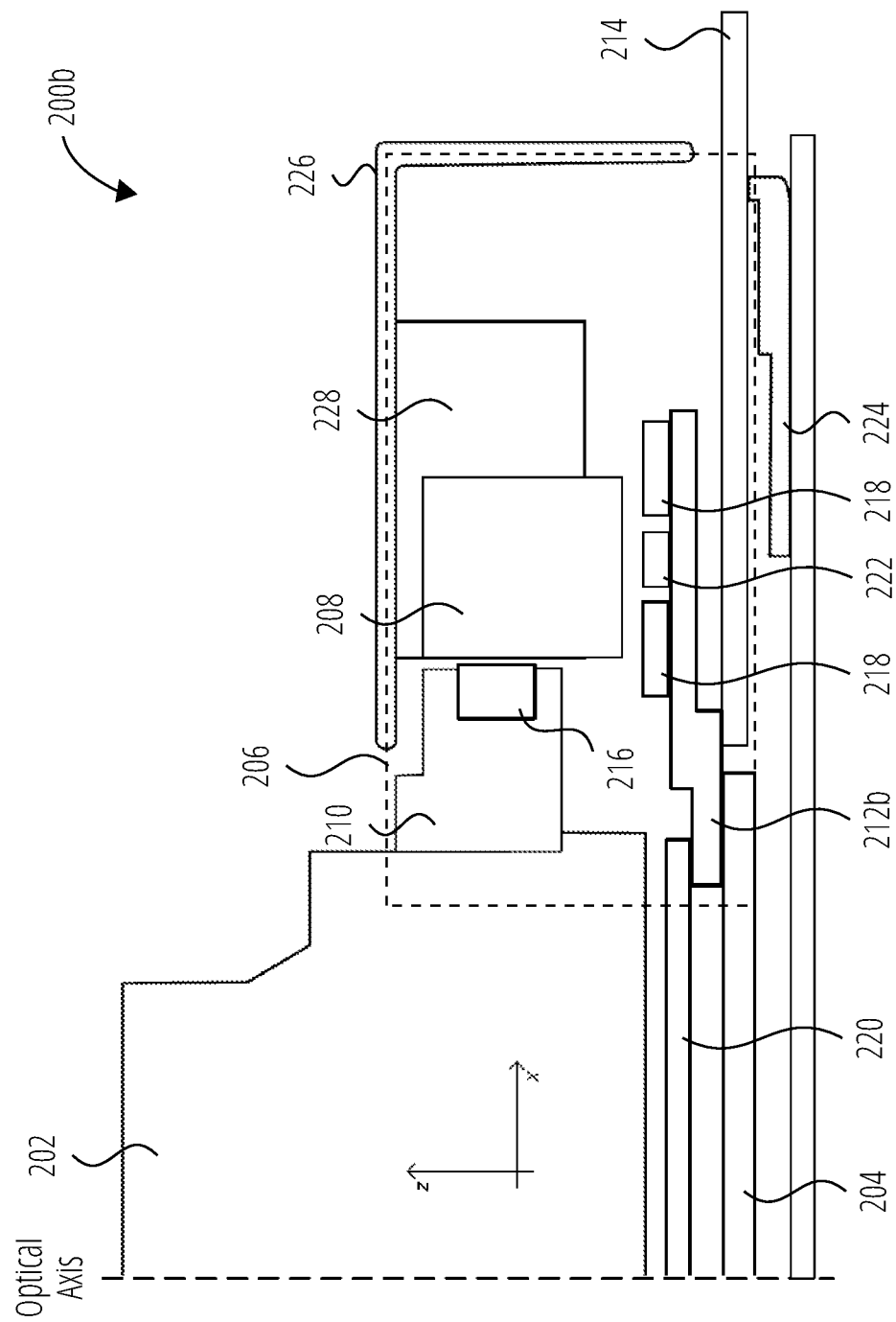
FIG. 2B illustrates a schematic cross-sectional side view of another example camera that may include a flexure-circuit hybrid structure that enables sensor shift actuation, in accordance with some embodiments.

FIGS. 2A-2B illustrate schematic cross-sectional side views of example cameras that may include a flexure-circuit hybrid structure that enables sensor shift actuation. In some embodiments, the cameras 200a and 200b may include a lens group 202, an image sensor 204, and a voice coil motor (VCM) actuator module 206. The lens group 202 may define an optical axis. The image sensor 204 may be configured to capture light passing through the lens group 202 and convert the captured light into image signals. In some cases, the VCM actuator module 206 may be one of multiple VCM actuator modules of the camera 200. For instance, the cameras 200a and 200b may include four such VCM actuator modules 206, such as two pairs of VCM actuator modules 206 that oppose one another relative to the lens group 202. The VCM actuator modules 206 may be configured to move the lens group 202 along the optical axis (e.g., in the Z-axis direction, to provide autofocus (AF) functionality) and/or tilt the lens group 202 relative to the optical axis. Furthermore, the VCM actuator module(s) 206 may be configured to move the image sensor 204 in directions orthogonal to the optical axis (e.g., in the X-axis and/or Y-axis directions, to provide optical image stabilization (OIS) functionality).

In various embodiments, the VCM actuator module 206 may include a magnet 208 (e.g., a stationary single pole magnet), a lens holder 210, a substrate 212a (in FIG. 2A) or substrate 212b (in FIG. 2B), a top flexure (not shown), and a bottom flexure (e.g., a flexure portion of flexure-circuit hybrid structure 214, which may be the same as, or similar to, flexure-circuit hybrid structure 102 in FIG. 1. Furthermore, the VCM actuator module 206 may include an AF coil 216 and a bottom sensor positioning (SP) coil 218.

In some embodiments, the lens holder 210 may hold, or otherwise support, the AF coil 216 proximate a side of the magnet 208. The lens holder 210 may be coupled to the lens group 202 such that the lens group 202 shifts together with the lens holder 210.

According to some embodiments, the substrate 212a in FIG. 2A may comprise an assembly of a different number of components, relative to the substrate 212b in FIG. 2B. For example, the substrate 212a in FIG. 2A may comprise a three-block assembly, and the substrate 212b in FIG. 2B may comprise a two-block assembly according to some embodiments. In various embodiments, the substrate 212 (e.g., substrate 212a in FIG. 2A or substrate 212b in FIG. 2B) may hold, or otherwise support, the bottom SP coil 218 proximate a bottom side of the magnet 208. The substrate 212 may be coupled to the image sensor 204 such that the image sensor 204 shifts together with the substrate 212. In some embodiments, the substrate 212 may also be coupled with, or may otherwise support, an infrared cut-off filter (IRCF) 220 (and/or one or more other optical elements), e.g., as indicated in FIG. 2A.

In some embodiments, the VCM actuator module 206 may include a position sensor 222 (e.g., a Hall sensor) for position detection based on movement of the SP coil 218 in directions orthogonal to the optical axis. For example, the position sensor 222 may be located on the substrate 212 proximate to the SP coil 218.

The flexure portion of the flexure-circuit hybrid structure 214 may be configured to provide compliance for motion of the substrate 212 in directions orthogonal to the optical axis. Furthermore, the flexure portion of the flexure-circuit hybrid structure 214 may be configured to suspend the substrate 212 and the image sensor 204 from one or more stationary structures 224 of the camera 200.

The top flexure (not shown) may be configured to mechanically and electrically connect the lens holder 210 to the shield can 226 and/or to one or more other stationary structures (e.g., stationary structure 224). The top flexure may be configured to provide compliance for movement of the lens holder 210 along the optical axis and for tilt of the lens holder 210 relative to the optical axis. The shield can 226 may encase, at least in part, an interior of the camera 200. The shield can 226 may be a stationary component that is static relative to one or more moving components (e.g., the lens holder 210 and substrate 212).

In some embodiments, the stationary magnet 214 may be fixed to a stationary structure (e.g., magnet holder 228). In some examples, each of the AF coil 216 and the SP coil 218 may be a racetrack coil.

Electromagnetic interaction between the AF coil 216 and the magnet 208 may produce Lorentz forces that cause the lens holder 210 to move along the optical axis and/or to tilt relative to the optical axis. Electromagnetic interaction between the SP coil 218 and the magnet 208 may produce Lorentz forces that cause the substrate 212 to move in directions orthogonal to the optical axis. The lens group 202 may shift together with (e.g., in lockstep with) the lens holder 210. Furthermore, the image sensor 204 may shift together with (e.g., in lockstep with) the substrate 212.

In various embodiments, electrical contacts/connections may allow for electrical signals (e.g., image signals) to be conveyed from the image sensor 204 to a controller (not shown). For instance, the image sensor 204 may be in electrical contact with the substrate 212 via one or more contacts, and thus image signals may be conveyed from the image sensor 204 to the substrate 212. The image signals may be conveyed from the substrate 212 to one or more external components (e.g., external component(s) 114 in FIG. 1) via the flexure portion and the flex circuit portion of the flexure-circuit hybrid structure 214. According to various examples, electrical contacts/connections may allow for current to be conveyed from the controller to the substrate 212 to drive the SP coil 218.

Figure 3A:
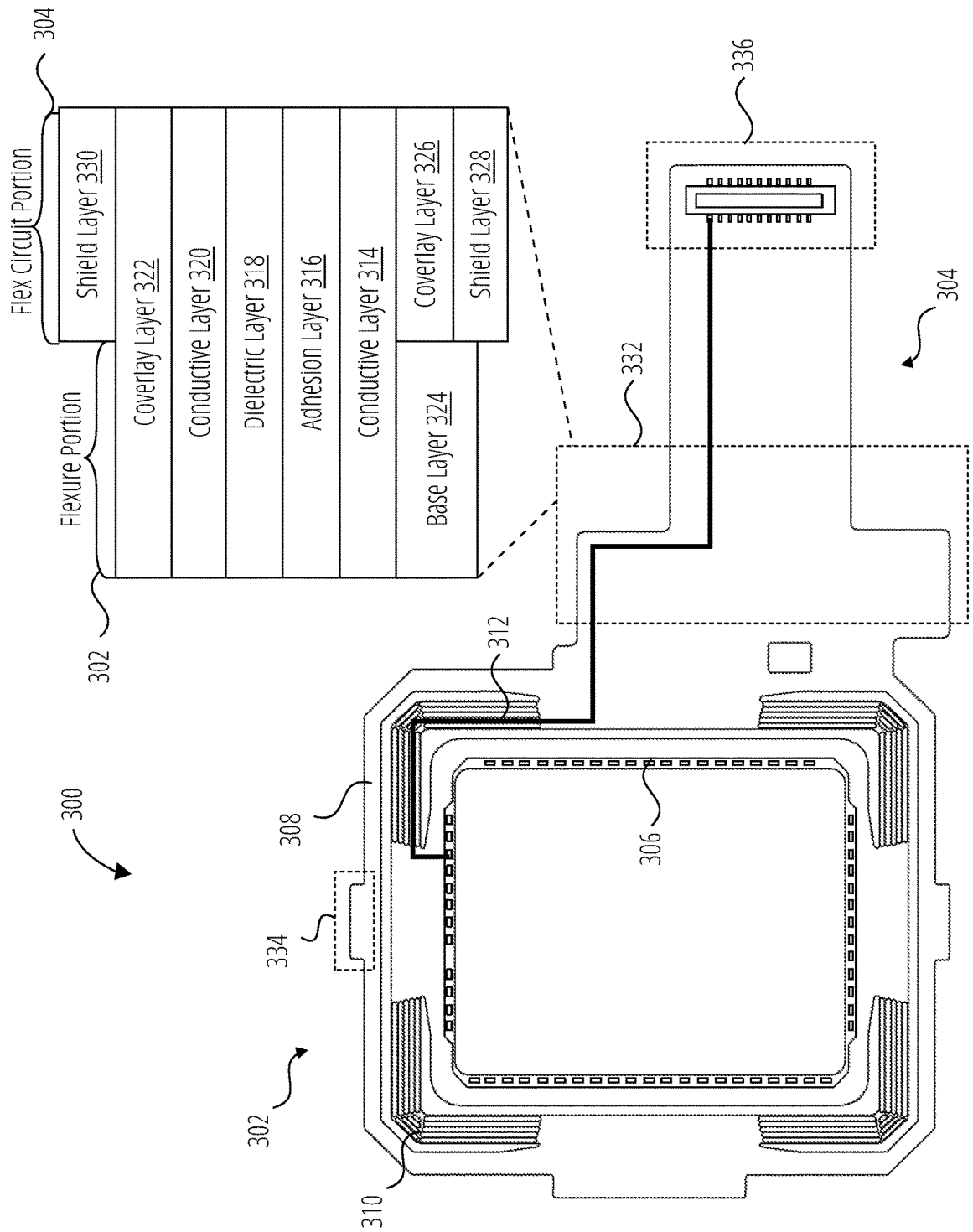
FIG. 3A illustrates a top view and a schematic block diagram of an example flexure-circuit hybrid structure for a camera with sensor shift actuation, in accordance with some embodiments.
Figure 3B:
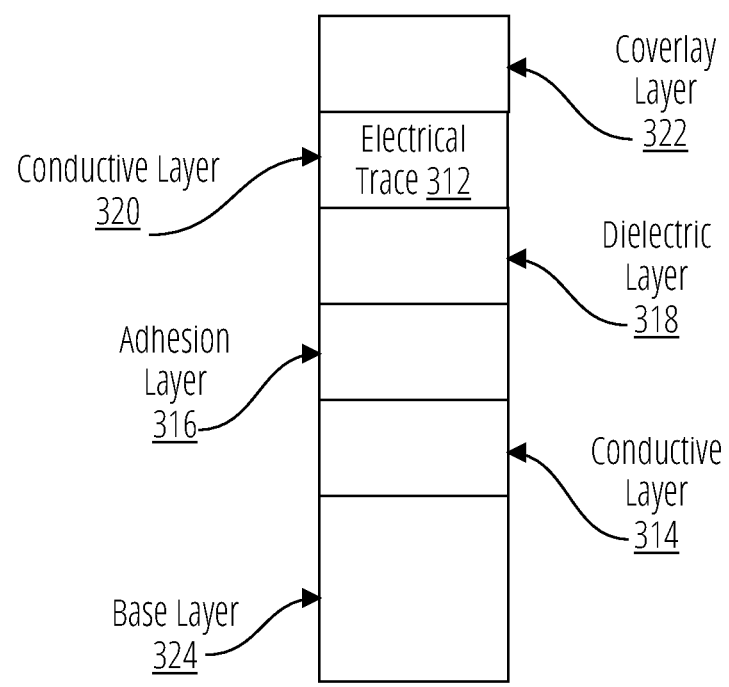
FIG. 3B illustrates a cross-sectional view of a portion of the flexure-circuit hybrid structure along which an electrical trace may be routed, in accordance with some embodiments.

FIG. 3A illustrates a top view and a schematic block diagram of an example flexure-circuit hybrid structure 300 for a camera (e.g., camera system 100 in FIG. 1, camera 200a in FIG. 2A, and camera 200b in FIG. 2B), etc.) with sensor shift actuation. FIG. 3B illustrates a cross-sectional view of a portion of the flexure-circuit hybrid structure along which an electrical trace may be routed, in accordance with some embodiments. For example, the cross-sectional view may correspond to a cross-section taken along a plane that is orthogonal to the image plane and orthogonal to a direction the electrical trace is configured to convey electrical signals. According to various embodiments, the flexure-circuit hybrid structure 300 may include a flexure portion 302 and a flex circuit portion 304.

In some embodiments, the flexure portion 302 may be configured to suspend an image sensor (e.g., image sensor 106 in FIG. 1, image sensor 204 in FIGS. 2A-2B, etc.) from a stationary structure (e.g., stationary structure 224 in FIGS. 2A-2B) of the camera. Additionally, or alternatively, the flexure portion 302 may be configured to allow motion of the image sensor enabled by actuator(s) (e.g., VCM actuator module 206 in FIGS. 2A-2B) of the camera. According to various embodiments, the flexure portion 302 may include an inner frame 306, an outer frame 308, and one or more flexure arms 310. The inner frame 306 may be fixedly coupled with the image sensor. For example, the camera may include a substrate (e.g., substrate 212a in FIG. 2A, substrate 212b in FIG. 2B, etc.) to which the image sensor is fixedly attached, and the substrate may be fixedly attached to the inner frame 306. The outer frame 308 may at least partially encircle the inner frame 306. The outer frame 308 may be fixedly coupled with a stationary structure (e.g., stationary structure 224 in FIGS. 2A-2B) of the camera. The flexure arm(s) 310 may be connected to the inner frame 306 and to the outer frame 308, e.g., as indicated in FIG. 3A. According to some embodiments, the flexure portion 302 may include electrical traces (e.g., electrical trace 312) on at least a portion of the flexure arm(s) 310. The electrical traces may be configured to convey electrical signals between the inner frame 306 and the outer frame 308, e.g., from the inner frame 306 to the outer frame 308, and vice-versa. As indicated in FIG. 3A, electrical trace 312 may be routed from the inner frame 306 to the outer frame 308 (via the flexure arm(s) 310), and from the outer frame 308 to the flex circuit portion 304. In various embodiments, different patterns of electrical traces may be routed from the inner frame 306 to the flex circuit portion 304. The electrical trace(s) may be insulated (e.g., via a dielectric layer and/or a coverlay layer, as discussed herein).

According to some embodiments, the flex circuit portion 304 may be configured to convey electrical signals between the flexure portion 302 and one or more other components. For example, the flex circuit portion 304 may route electrical signals between the flexure portion 302 and external component(s) (e.g., external component(s) 114 in FIG. 1) that are external to the camera, e.g., as discussed herein with reference to FIGS. 1 and 4B.

In various embodiments, the flexure-circuit hybrid structure 300 may comprise layers of material that are stacked in a first direction orthogonal to an image plane of the image sensor, e.g., as indicated in the schematic block diagram of layers 316-330 in a first region 332 of flexure-circuit hybrid structure 300. The flexure portion 302 and the flex circuit portion 304 may share a subset of the layers 316-330. In the first region 332, for example, the shared layers may include a first conductive layer 314, an adhesion layer 316, a dielectric layer 318, a second conductive layer 320 (which may include electrical traces, such as electrical trace 312, as indicated in FIG. 3B), and/or a coverlay layer 322. It should be appreciated that the shared layers may differ (e.g., with respect to quantity, material(s), size(s), shape(s), and/or order of arrangement, etc.) in various embodiments. As indicated in FIG. 3A, each of the shared layers may comprise a respective contiguously formed layer that extends in a second direction parallel to the image plane, between the flexure portion 302 and the flex circuit portion 304, e.g., such that the flexure portion 302 and the flex circuit portion 304 are integrated with one another in singular component (the flexure-circuit hybrid structure 300). By contrast, as discussed in FIG. 4A, some other systems may include two discrete components—a flexure and a flex circuit—that are joined together after the two components have already been separately formed.

In some embodiments, the first conductive layer 314 and/or the second conductive layer 320 may comprise copper. For example, the first conductive layer 314 and/or the second conductive layer 320 may comprise electroplated copper. Furthermore, the first conductive layer 314 and/or the second conductive layer 320 may have a respective thickness, in the first direction orthogonal to the image plane, ranging from 2 um to 30 um in some embodiments.

In some embodiments, the adhesion layer 316 and/or the dielectric layer 318 may be positioned, in the first direction orthogonal to the image plane, between the first conductive layer 314 and the second conductive layer 320. The coverlay layer 322 may be disposed adjacent the second conductive layer 320, e.g., such that the second conductive layer 320 is sandwiched between the coverlay layer 322 and the dielectric layer 318. In various embodiments, the adhesion layer 316 may be disposed between the conductive layer 314 and the dielectric layer 318. According to some embodiments, the adhesion layer 316 may comprise chromium (e.g., physical vapor deposited (PVD) chromium). Furthermore, the adhesion layer 316 may have a thickness, in the first direction orthogonal to the image plane, ranging from 50 nm to 300 nm in some embodiments. The dielectric layer 318 may be disposed between the adhesion layer 316 and the second conductive layer 320. According to some embodiments, the dielectric layer 318 may comprise polyimide (e.g., photosensitive polyimide) and/or a build-up film (e.g., a dry insulation build-up film), etc. Furthermore, the dielectric layer 318 may have a thickness, in the first direction, ranging from 8 um to 14 um in some embodiments.

According to various embodiments, the shared layers (e.g., shared layers 314-322) may be a subset of all the layers in the first region 332. In some embodiments, the flexure portion 302 may include one or more layers, in addition to the shared layers, that are different from one or more layers of the flex circuit portion 304. For example, the flexure portion 302 may include a base layer 324 that the flexure portion 302 does not share with the flex circuit portion 304. Additionally, or alternatively, the flex circuit portion 304 may include a coverlay layer 326 (e.g., polyimide, a Flex-finer material, etc.), a shield layer 328, and/or a shield layer 330 that the flex circuit portion 304 does not share with the flexure portion 302. In some embodiments, the shield layer 328 and/or the shield layer 330 may comprise an electromagnetic interference (EMI) shield layer for reducing EMI between the electrical signals (conveyed via the flex circuit portion 304) and components of the camera and/or external components.

According to some embodiments, the base layer 324 may be configured to provide sufficient rigidity so that the flexure portion 302 is capable of suspending an image sensor package from a stationary structure of the camera. Furthermore, at least a portion of the base layer 324 may be configured to have sufficient compliance for allowing motion of the image sensor in the direction(s) enabled by the actuator. In some embodiments, the base layer 324 may be positioned, in the first direction orthogonal to the image plane, adjacent the first conductive layer 314. Additionally, or alternatively, the base layer 324 may be positioned, in the second direction parallel to the image plane, adjacent the coverlay layer 326 and/or the shield layer 328. According to some embodiments, the coverlay layer 326 may be positioned, in the first direction, adjacent the first conductive layer 314 and/or the shield layer 328. In various embodiments, the shield layers 328 and 330 may be the outermost layers of the flex circuit portion 304 in the first region 332. The shield layer 328 and/or the shield layer 330 may comprise silver (e.g., silver mesh shielding) and/or copper (e.g., copper-sputtered shielding), etc., in various embodiments.

In some non-limiting embodiments, the base layer 324 may comprise a nickel-cobalt (NiCo) alloy and/or a copper titanium (CuTi) alloy (e.g., having an electrical conductivity of 10%-40% International Annealed Copper Standard (IACS)). In some embodiments, the base layer 324 may comprise electro-formed NiCo for areas of the flexure portion 302, to increase rigidity in those areas. Furthermore, the base layer 324 may have a thickness, in the first direction orthogonal to the image plane, ranging from 30 um to 150 um.

It should be understood that various regions of the flexure-circuit hybrid structure 300 may have one or more layers that are different than those described with respect to the first region 332. As a non-limiting example, the second region 334 of the flexure portion 302 may comprise a stack of layers that differs relative to the flexure portion 302 in the first region 332. Additionally, or alternatively, the third region 336 of the flex circuit portion 304 may comprise a stack of layers that differs relative to the flex circuit portion 304 in the first region 332.

Figure 4A:
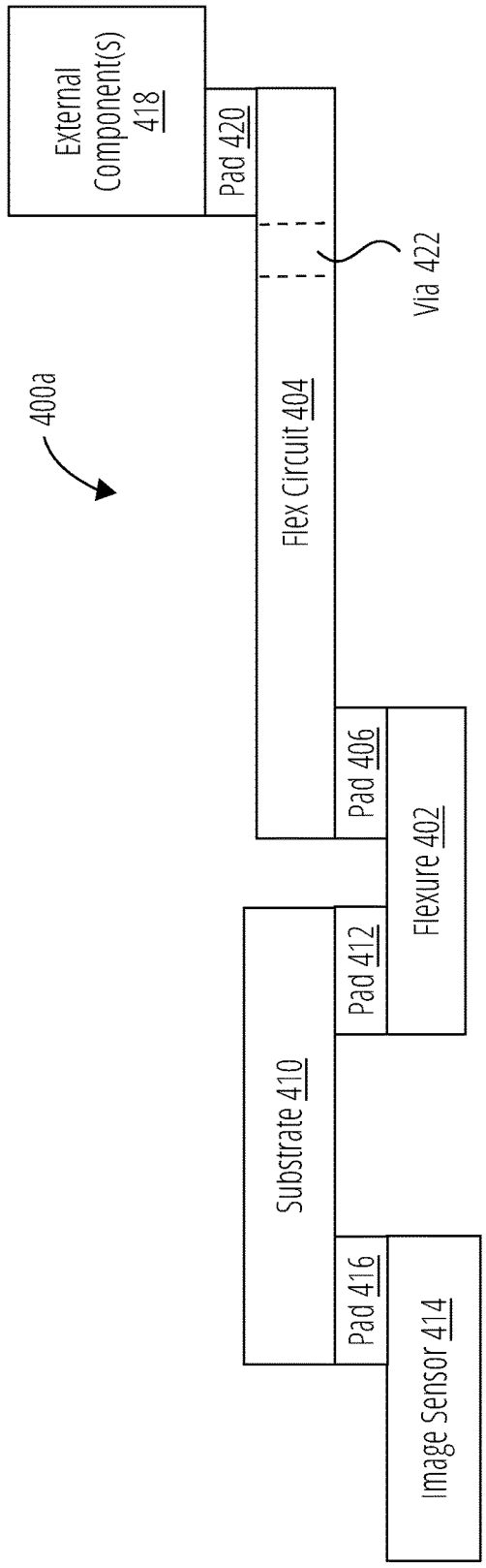
FIG. 4A illustrates a schematic cross-sectional side view of a portion of an example camera including a flexure that is bonded to a flex circuit.

FIG. 4A illustrates a schematic cross-sectional side view of a portion of an example camera 400a including a flexure 402 that is bonded to a flex circuit 404, e.g., via anisotropic conductive film (ACF) bonding pad 406. By contrast, FIG. 4B illustrates a schematic cross-sectional view of a portion of an example camera 400b that includes a flexure-circuit hybrid structure 408 in accordance with embodiments disclosed herein.

Figure 4B:
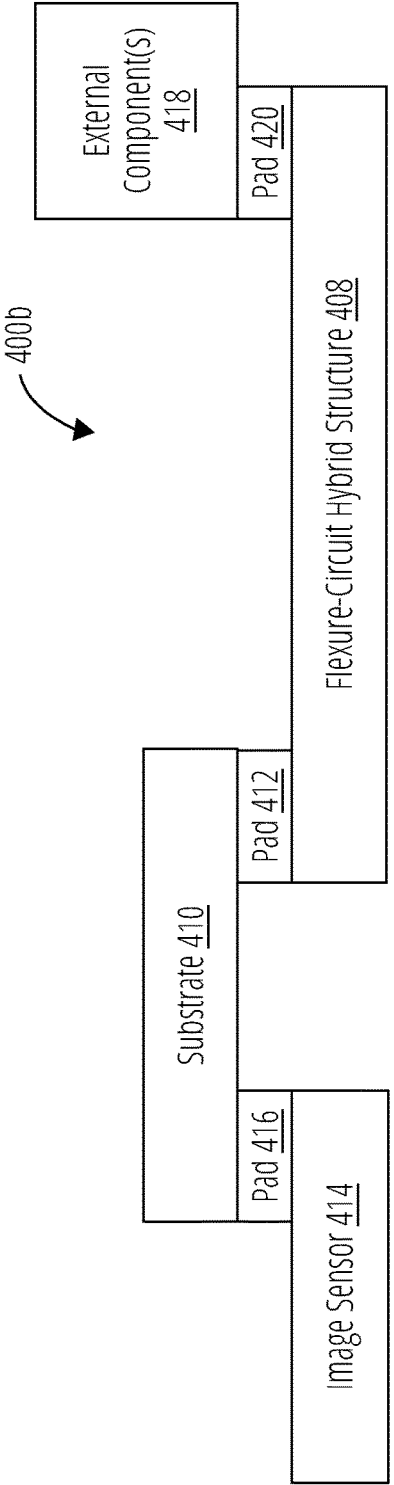
FIG. 4B illustrates a schematic cross-sectional side view of a portion of an example camera including a flexure-circuit hybrid structure that enables sensor shift actuation, in accordance with some embodiments.

As indicated in FIGS. 4A-4B, the cameras 400a and 400b may include a substrate 410 that is bonded to the flexure 402 (in FIG. 4A) or to the flexure-circuit hybrid structure 408 (in FIG. 4B), e.g., via ACF bonding pad 412. The substrate 410 may be bonded to an image sensor 414, e.g., via ACF bonding pad 416. Instead of bonding a flexure to a flex circuit (as in FIG. 4A), the flexure-circuit hybrid structure 408 may be a single component that integrates structural and/or functional aspects of the flexure and the flex circuit, thus eliminating the need for ACF bonding pad 406 (FIG. 4A). In camera 400b, the flexure-circuit hybrid structure 408 may be bonded to external component(s) 418, e.g., via ACF bonding pad 420.

Electrical signals may be routed between the image sensor 414 and the external component(s) 418 at least partly via the flexure-circuit hybrid structure 408. For example, an electrical signals may be routed along a path that includes the image sensor 414, ACF bonding pad 416, the substrate 410, ACF bonding pad 412, the flexure-circuit hybrid structure 408, ACF bonding pad 420, and the external component(s) 418, in that order from the image sensor 414 to the external component(s) 418, and/or vice-versa. This example electrical signal routing may eliminate one or more potential discontinuities present in the other camera 400a that may adversely impact performance. For example, the ACF bonding pad 406 used in the other camera 400a (to bond the flexure 402 to the flex circuit 404) may comprise an impedance discontinuity, the elimination of which (in the camera 400b having the flexure-circuit hybrid structure 408) may improve signal integrity and/or power integrity (due to removal of IR drop caused by the ACF bonding pad 406).

Additionally, or alternatively, the other camera 400a may include a via 422 that is used to route electrical signals from one side (e.g., a bottom side) of the flex circuit 404 to the opposite side (e.g., a top side) of the flex circuit 404. The via 422 may similarly comprise an impedance discontinuity that may be eliminated by using the flexure-circuit hybrid structure 408 in camera 400b. For example, in FIG. 4B, electrical signals may be routed along a top side of the flexure-circuit hybrid structure 408, to the external component(s) 418 via ACF bonding pad 420. Unlike the arrangement in FIG. 4A, the flexure-circuit hybrid structure 408 does not include the ACF bonding pad 406 that bonds a top side of the flexure 402 to a bottom side of the flex circuit 404 (which may require use of the via 422 to convey the electrical signals to the opposite side of the flex circuit 404); rather, the flexure-circuit hybrid structure 408 may receive the electrical signals, and may convey them without the aforementioned discontinuities, along a same side (e.g., the top side of the flexure-circuit hybrid structure 408, via the ACF bonding pad 412 connection to the substrate 410 and/or the ACF bonding pad 420 connection to the external component(s) 418.

In some embodiments, the flexure-circuit hybrid structure 408 may be formed in a component-level process that eliminates one or more assembly processes (e.g., an ACF bonding process), reduces the supply chain, and/or improves the manufacturing process involved with respect to a camera with sensor shift actuation. In some embodiments, the flexure-circuit hybrid structure 408 in the camera 400b may enable higher data transfer rates, improved power delivery, and/or improved thermal performance, relative to the arrangement in the other camera 400a.

Figure 5:
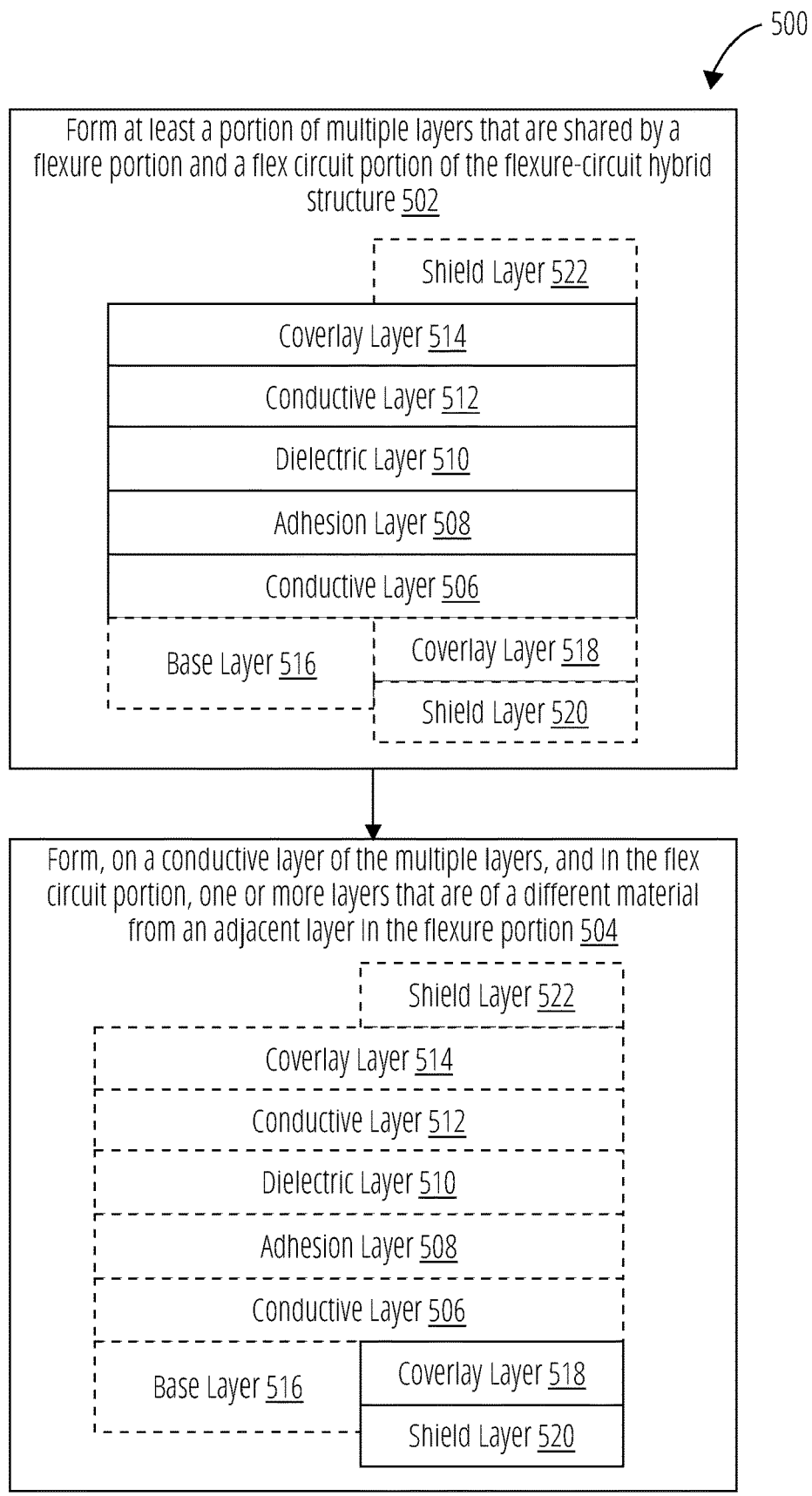
FIG. 5 is a flowchart of an example method of fabricating at least a portion of a camera that includes a flexure-circuit hybrid structure that enables sensor shift actuation, in accordance with some embodiments.

FIG. 5 is a flowchart of an example method 500 of fabricating at least a portion of a camera (e.g., camera system 100 in FIG. 1, camera 200a in FIG. 2A, camera 200b in FIG. 2B, etc.) that includes a flexure-circuit hybrid structure (e.g., flexure-circuit hybrid structure 102 in FIG. 1, flexure-circuit hybrid structure 214 in FIGS. 2A-2B, flexure-circuit hybrid structure 300 in FIG. 3A, flexure-circuit hybrid structure 408 in FIG. 4B) that enables sensor shift actuation.

As previously mentioned, the flexure-circuit hybrid structure may include a plurality of layers stacked in a first direction (e.g., orthogonal to an image plane of the image sensor), such as layers 314-330 described herein with reference to FIG. 3A. The layers may comprise a flexure portion for suspending the image sensor form a stationary structure of the camera and for allowing motion of the image sensor enabled by an actuator of the camera. Furthermore, the layers may comprise a flex circuit portion for conveying electrical signals between the flexure portion and one or more other components (e.g., external component(s) that are external to the camera). The flex circuit portion may extend from the flexure portion in a second direction that is orthogonal to the first direction (and/or parallel to the image plane). According to various embodiments, the flexure portion and the flex circuit portion may share multiple layers (e.g., including one or more of shared layers 506-514 in FIG. 5).

At 502, the method 500 may include forming at least a portion of multiple layers that are shared by the flexure portion and the flex circuit portion of the flexure-circuit hybrid structure. For example, forming at least a portion of the shared layers may include forming the first conductive layer 506, the adhesion layer 508, the dielectric layer 510, the second conductive layer 512, and/or the coverlay layer 514 in some embodiments. In some embodiments, the adhesion layer 508 may be formed between the first conductive layer 506 and the dielectric layer 510. Furthermore, the second conductive layer 512 may be positioned adjacent the dielectric layer 510.

At 504, the method 500 may include forming, on a conductive layer of the multiple layers, and in a region of the flex circuit portion, one or more layers that are of a different material from an adjacent layer in a region of the flexure portion. For example, the adjacent layer in the region of the flexure portion may be the base layer 516. Forming the layer(s) that are of a different material from the adjacent layer may include forming the coverlay layer 518 and/or forming the shield layer 520 in some embodiments.

Figure 6A:
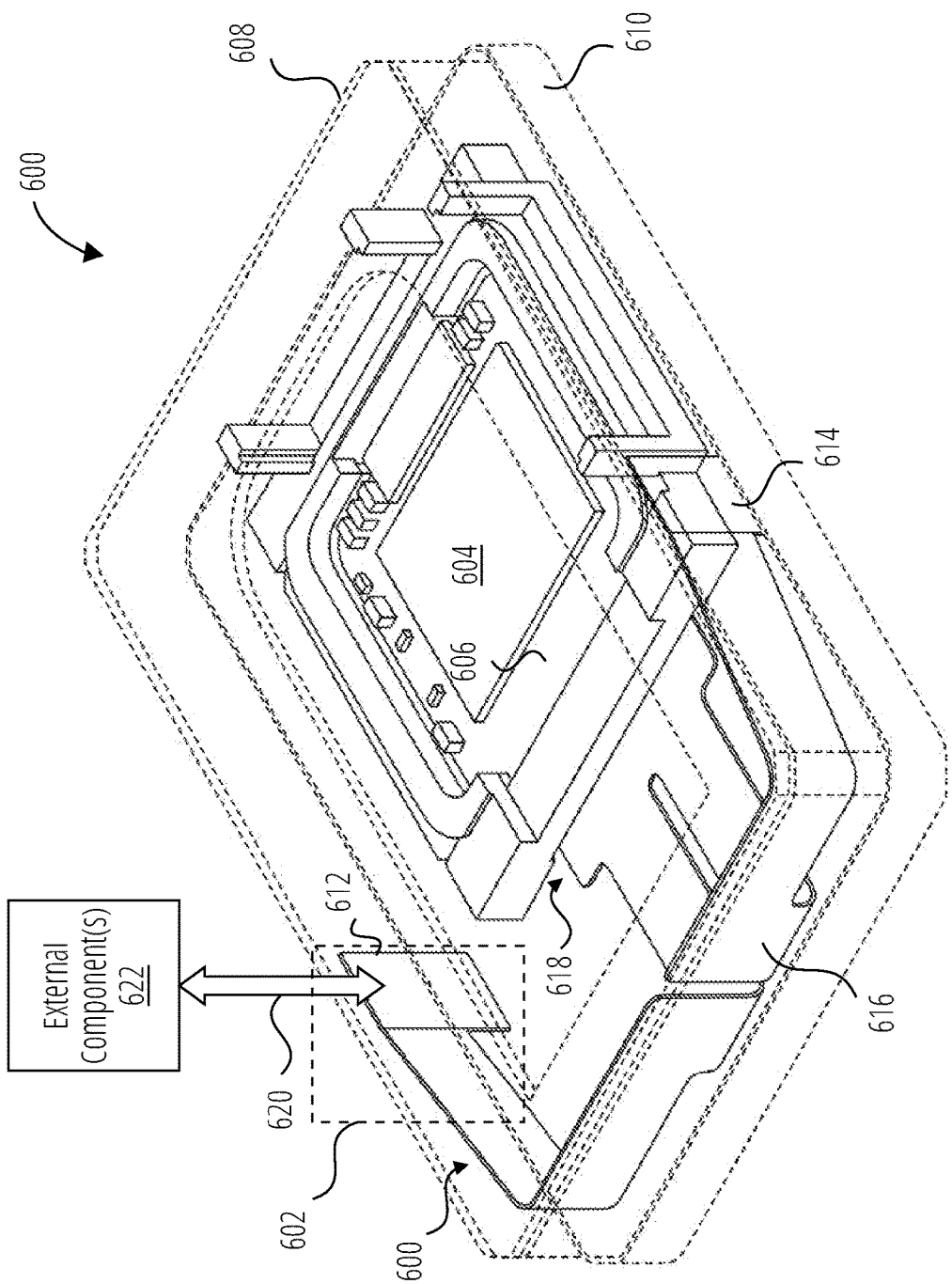
FIG. 6A illustrates a perspective view of a camera including an example actuation-module flex circuit hybrid structure for a camera with sensor shift actuation, in accordance with some embodiments.
Figure 6B:
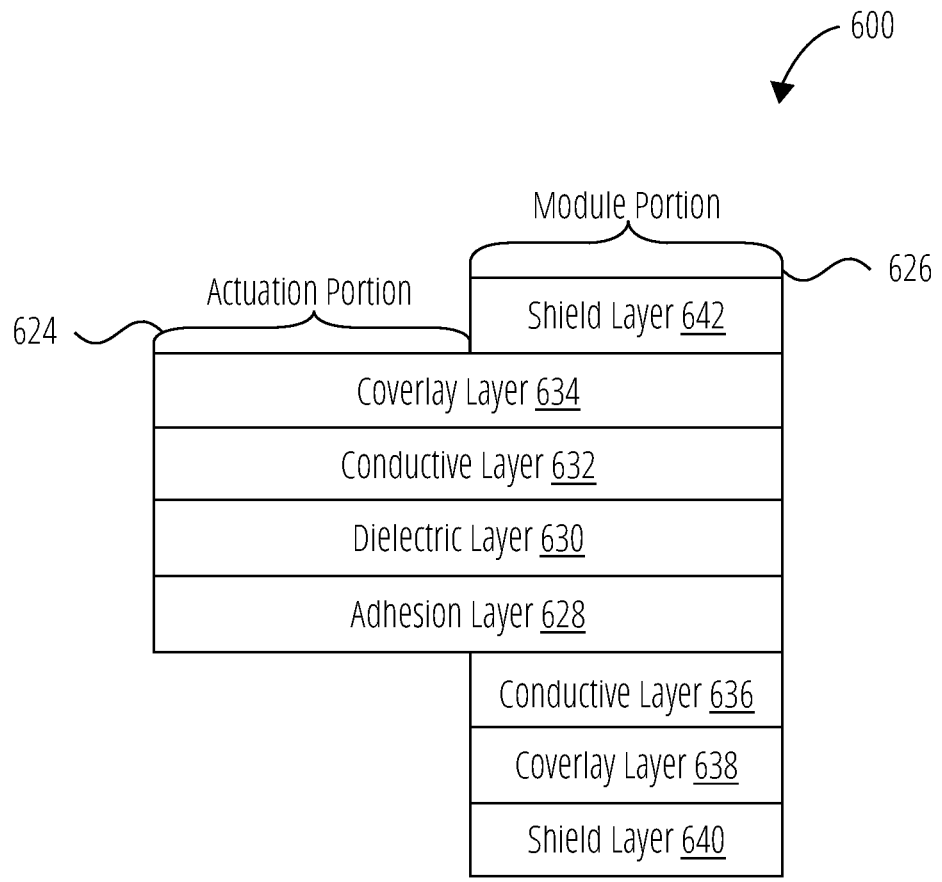
FIG. 6B illustrates a cross-sectional view of a portion of the actuation-module flex circuit hybrid structure along which one or more electrical traces may be routed, in accordance with some embodiments.

FIG. 6A illustrates a perspective view of an example actuation-module flex circuit hybrid structure for a camera 600 with sensor shift actuation, in accordance with some embodiments. FIG. 6B illustrates a cross-sectional view of a portion 602 of the actuation-module flex circuit hybrid structure along which one or more electrical traces may be routed, in accordance with some embodiments.

According to some embodiments, the camera 600 may include one or more flex circuits (e.g., comprising the actuation-module flex circuit hybrid structure), an image sensor 604, a substrate 606, and one or more stationary structures (e.g., stationary structure 608, base structure 610, etc.). The image sensor 604 may be attached to the substrate 606 and/or one or more other components, such as a moveable platform of a suspension arrangement of the camera 600.

In some embodiments, the flex circuit(s) may include one or more fixed end portions (e.g., fixed end portion 612 and/or fixed end portion 614), an intermediate portion 616, and a moveable end portion 618 (partially obstructed from the reader's view by other components in FIG. 6A). The fixed end portions 612 and 614 may be coupled with the stationary structure 608. In some embodiments, rather than including the actuation-module flex circuit hybrid structure, the camera 600 and/or the stationary structure 608 may comprise a separate stationary/module flex circuit (not shown) that is attached to a dynamic/actuation flex circuit at the fixed end portions 612 and 614.

In embodiments in which the actuation-module flex circuit hybrid structure 602 is included, as schematically indicated in FIG. 6A using double arrows 620 (representing a portion of a flex circuit), the actuation-module flex circuit hybrid structure 602 which continuously extends from the fixed end portion(s) (e.g., fixed end portion 612) to one or more external components 622 (e.g., external component(s) 418 in FIGS. 4A and 4B). The actuation-module flex circuit hybrid structure 602 may include an actuation portion 624 (FIG. 6B) and a module portion 626 (FIG. 6B) that share one or more layers, as discussed in further detail herein with reference to FIG. 6B.

In some embodiments, the actuation portion 624 may include one or more portions of a dynamic flex circuit designed to enable actuation movement (e.g., sensor shift actuation and/or other motion enabled by an actuator) while also being capable of conveying electrical signals. For example, in some embodiments, the actuation portion 624 may include the moveable end portion 618, the intermediate portion 616, and/or the fixed end portion 612. In some embodiments, the module portion 626 may include one or more portions of a module flex circuit designed, at least in part, to convey electrical signals between the camera 600 and the external component(s) 622. For example, in some embodiments, the module portion 626 may include a portion of the actuation-module flex circuit hybrid structure 602 that extends from the actuation portion 624 and is ultimately connected to the external component(s) 622, so as to be capable of conveying electrical signals between the actuation portion 624 and the external component(s) 622. The module portion 626 may be stationary in various embodiments. Furthermore, while a straight path between fixed end portion 612 and the external component(s) 622 is schematically indicated in FIG. 6A via double arrows 620, the module portion 626 may include one or more bends. For example, some of the module portion 626 may be bent/folded to extend along multiple different planes (e.g., along different sides of the camera 600 for efficient use of space).

In various embodiments the actuation-module flex circuit hybrid structure 602 may comprise layers of material that are stacked, e.g., as indicated in the schematic block diagram of layers 628-642 in FIG. 6B. The flexure portion 302 and the flex circuit portion 304 may share a subset of the layers 326-340. In the portion 602 of the actuation-module flex circuit hybrid structure, for example, the shared layers may include an adhesion layer 628, a dielectric layer 630, a conductive layer 632 (which may include electrical traces, such as electrical trace 312 in FIG. 3B), and/or a coverlay layer 634. It should be appreciated that the shared layers may differ (e.g., with respect to quantity, material(s), size(s), shape(s), and/or order of arrangement, etc.) in various embodiments. As indicated in FIG. 6B, each of the shared layers may comprise a respective contiguously formed layer, such that the actuation portion 624 and the module portion 626 are integrated with one another in singular component (the actuation-module flex circuit hybrid structure). By contrast, as previously mentioned, some other systems may include two discrete components—an actuation flex circuit and a module flex circuit—that are joined together after the two components have already been separately formed.

In various embodiments, the actuation portion 624 and/or the module portion 626 may include one or more layers that are not shared between the two portions 624 and 626. For example, as indicated in FIG. 6B, the module portion 626 may include a conductive layer 636, a coverlay layer 638, a shield layer 640, and/or a shield layer 642 that are not included in the actuation portion 624.

In some embodiments, the conductive layer 634 and/or the conductive layer 636 may comprise copper. For example, the conductive layer 634 and/or the conductive layer 636 may comprise electroplated copper.

In some embodiments, the adhesion layer 628 may be positioned, in a stacked direction, between the conductive layer 636 and the dielectric layer 630. The conductive layer 632 may be positioned, in the stacked direction, between the dielectric layer 630 and the coverlay layer 634. The coverlay layer 638 may be disposed adjacent the conductive layer 636, e.g., such that the conductive layer 636 is sandwiched between the coverlay layer 638 and the adhesion layer 628. The shield layer 640 may be disposed adjacent the coverlay layer 638, and the shield layer 642 may be disposed adjacent the coverlay layer 634.

According to some embodiments, the adhesion layer 628 may comprise chromium (e.g., physical vapor deposited (PVD) chromium). Furthermore, the adhesion layer 628 may have a thickness, in the stacked direction, ranging from 50 nm to 300 nm in some embodiments. The dielectric layer 630 may be disposed between the adhesion layer 628 and the conductive layer 632. According to some embodiments, the dielectric layer 630 may comprise polyimide (e.g., photosensitive polyimide) and/or a build-up film (e.g., a dry insulation build-up film), etc. Furthermore, the dielectric layer 630 may have a thickness, in the stacked direction, ranging from 8 um to 14 um in some embodiments.

According to various embodiments, the module portion 626 may include conductive layer 636, coverlay layer 638 (e.g., polyimide, a Flex-finer material, etc.), shield layer 640, and/or shield layer 642 that the module portion 626 does not share with the actuation portion 624. In some embodiments, the shield layer 640 and/or the shield layer 642 may comprise an electromagnetic interference (EMI) shield layer for reducing EMI between the electrical signals (conveyed via the module portion 626) and components of the camera and/or external components. In various embodiments, the shield layers 640 and 642 may be the outermost layers of the module portion 626. The shield layer 640 and/or the shield layer 642 may comprise silver (e.g., silver mesh shielding) and/or copper (e.g., copper-sputtered shielding), etc., in various embodiments.

As similarly discussed herein with reference to FIGS. 4A-4B, the actuation-module flex circuit hybrid structure 602 may enable elimination of one or more potential discontinuities present in the other designs that may adversely impact performance. For example, in other designs, a bonding pad may be used to bond an actuation flex circuit to a module flex circuit, similar to how pad 406 is required for attaching flexure 402 to flex circuit 404 in FIG. 4A. The bonding pad may comprise an impedance discontinuity, the elimination of which (using the actuation-module flex circuit hybrid structure 602 disclosed herein) may improve signal integrity and/or power integrity (due to removal of IR drop caused by the bonding pad that might otherwise be present).

Additionally, or alternatively, other designs may include a via (e.g., via 422 in FIG. 4A) that is used to route electrical signals from one side (e.g., a bottom side) of module flex circuit to the opposite side (e.g., a top side) of the module flex circuit. The via may similarly comprise an impedance discontinuity that may be eliminated by using the actuation-module flex circuit hybrid structure 602 in camera 600. For example, electrical signals may be routed along a top side of the actuation module flex circuit hybrid structure 602, to the external component(s) 622, as similarly discussed herein with reference to the flexure-circuit hybrid structure 408 in FIG. 4B.

In some embodiments, the actuation-module flex circuit hybrid structure 602 may be formed in a component-level process that eliminates one or more assembly processes (e.g., an ACF bonding process), reduces the supply chain, and/or improves the manufacturing process involved with respect to a camera with sensor shift actuation. In some embodiments, the actuation-module flex circuit hybrid structure 602 in the camera 600 may enable higher data transfer rates, improved power delivery, and/or improved thermal performance, relative to other arrangements in which an actuation flex circuit is attached to a module flex circuit.

Figure 7:
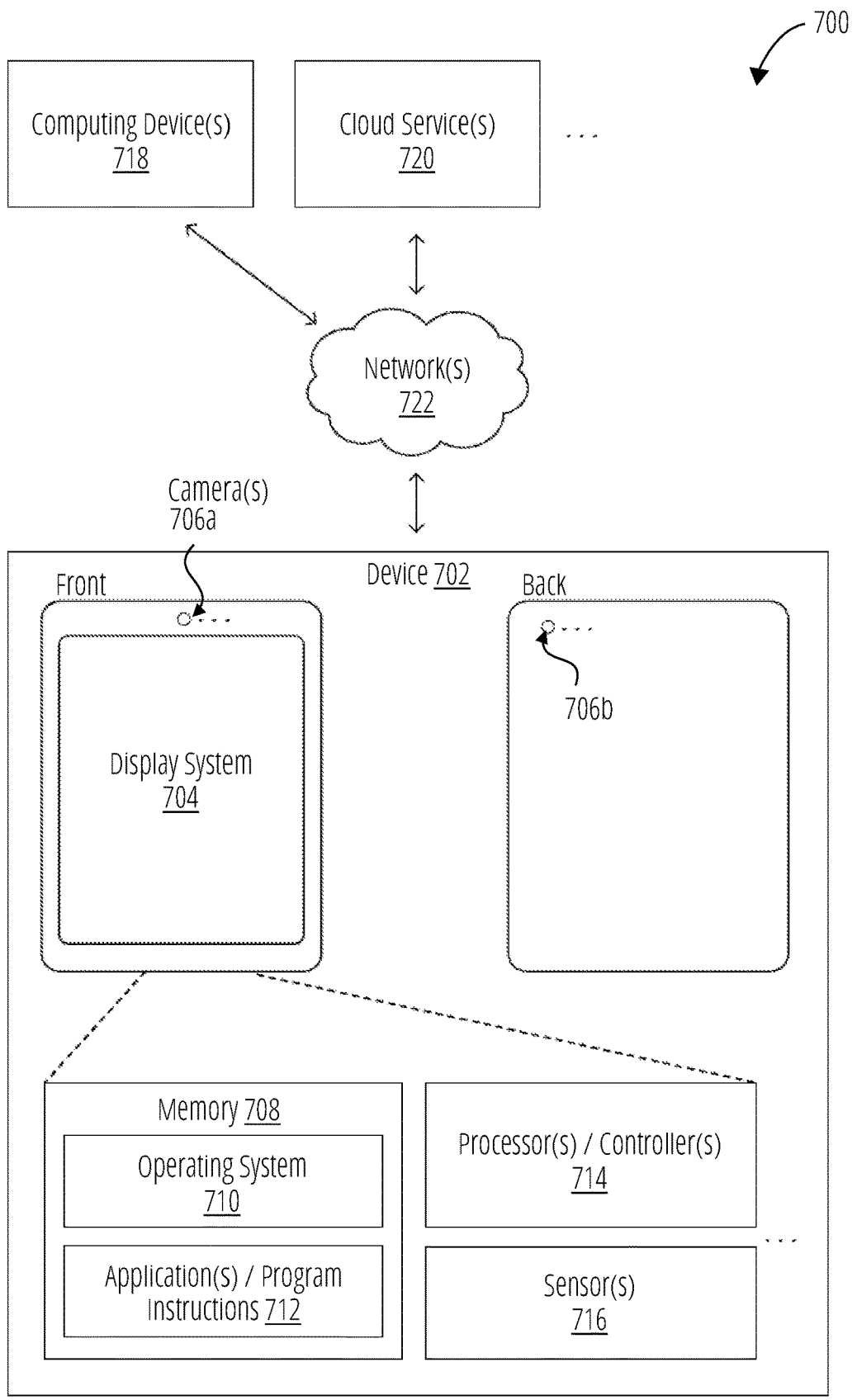
FIG. 7 illustrates a schematic representation of an example environment comprising a device that may include a camera with a flexure-circuit hybrid structure that enables sensor shift actuation and/or a camera with an actuation-module flex circuit hybrid structure that enables sensor shift actuation, in accordance with some embodiments.

FIG. 7 illustrates a schematic representation of an example environment 700 comprising a device 702 that may include one or more cameras. For example, the device 702 may include a camera system having a flexure-circuit hybrid structure that enables sensor shift actuation (such as camera system 100 in FIG. 1) and/or a camera with an actuation-module flex circuit hybrid structure that enables sensor shift actuation (such as camera system 600 in FIG. 6A). In some embodiments, the device 702 may be a mobile device and/or a multifunction device. In various embodiments, the device 702 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 702 may include a display system 704 (e.g., comprising a display and/or a touch-sensitive surface) and/or one or more cameras 706. In some non-limiting embodiments, the display system 704 and/or one or more front-facing cameras 706a may be provided at a front side of the device 702, e.g., as indicated in FIG. 7. Additionally, or alternatively, one or more rear-facing cameras 706b may be provided at a rear side of the device 702. In some embodiments comprising multiple cameras 706, some or all of the cameras 706 may be the same as, or similar to, each other. Additionally, or alternatively, some or all of the cameras 706 may be different from each other. In various embodiments, the location(s) and/or arrangement(s) of the camera(s) 706 may be different than those indicated in FIG. 7.

Among other things, the device 702 may include memory 708 (e.g., comprising an operating system 710 and/or application(s)/program instructions 712), one or more processors and/or controllers 714 (e.g., comprising CPU(s), memory controller(s), display controller(s), and/or camera controller(s), etc.), and/or one or more sensors 716 (e.g., orientation sensor(s), proximity sensor(s), and/or position sensor(s), etc.). In some embodiments, the device 702 may communicate with one or more other devices and/or services, such as computing device(s) 718, cloud service(s) 720, etc., via one or more networks 722. For example, the device 702 may include a network interface (e.g., network interface 812 in FIG. 8) that enables the device 702 to transmit data to, and receive data from, the network(s) 722. Additionally, or alternatively, the device 702 may be capable of communicating with other devices via wireless communication using any of a variety of communications standards, protocols, and/or technologies.

Figure 8:
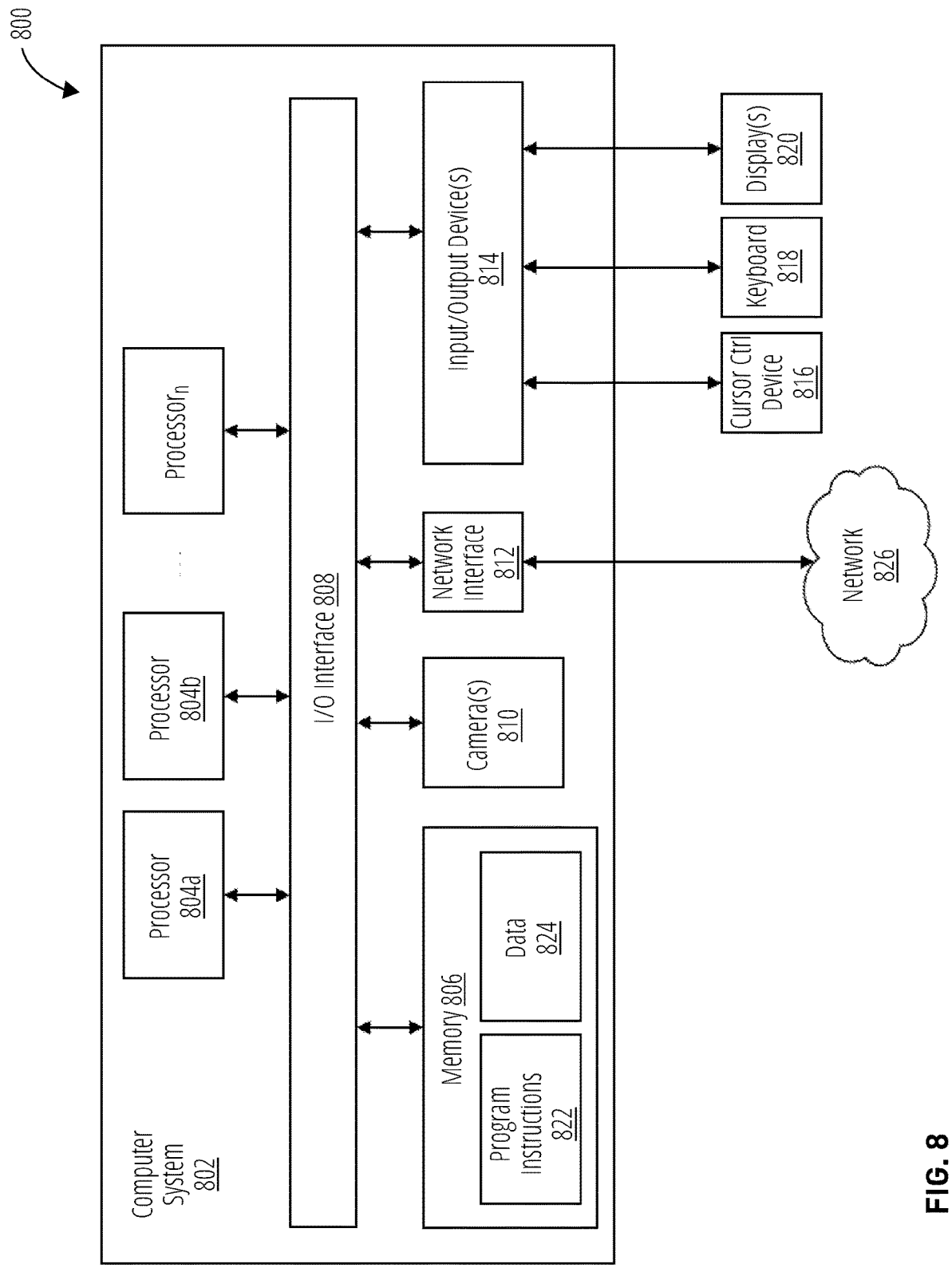
FIG. 8 illustrates a schematic block diagram of an example environment comprising a computer system that may include a camera with a flexure-circuit hybrid structure that enables sensor shift actuation and/or a camera with an actuation-module flex circuit hybrid structure that enables sensor shift actuation, in accordance with some embodiments.

FIG. 8 illustrates a schematic block diagram of an example environment 700 comprising a computer system 802 that may include a camera with a flexure-circuit hybrid structure that enables sensor shift actuation, e.g., as described herein with reference to FIGS. 1-7. In addition, computer system 802 may implement methods for controlling operations of the camera and/or for performing image processing on images captured with the camera. In some embodiments, the device 702 (described herein with reference to FIG. 7) may additionally, or alternatively, include some or all of the functional components of the described herein.

The computer system 802 may be configured to execute any or all of the embodiments described above. In different embodiments, computer system 802 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 802 includes one or more processors 704 coupled to a system memory 806 via an input/output (I/O) interface 808. Computer system 802 further includes one or more cameras 810 coupled to the I/O interface 808. Computer system 802 further includes a network interface 812 coupled to I/O interface 808, and one or more input/output devices 814, such as cursor control device 816, keyboard 818, and display(s) 820. In some cases, it is contemplated that embodiments may be implemented using a single instance of computer system 802, while in other embodiments multiple such systems, or multiple nodes making up computer system 802, may be configured to host different portions or instances of embodiments. For example, in one embodiment some elements may be implemented via one or more nodes of computer system 802 that are distinct from those nodes implementing other elements.

In various embodiments, computer system 802 may be a uniprocessor system including one processor 704, or a multiprocessor system including several processors 804 (e.g., two, four, eight, or another suitable number). Processors 804 may be any suitable processor capable of executing instructions. For example, in various embodiments processors 804 may be general-purpose or embedded processors implementing any of a variety of instruction set architectures (ISAs), such as the x86, PowerPC, SPARC, or MIPS ISAs, or any other suitable ISA. In multiprocessor systems, each of processors 804 may commonly, but not necessarily, implement the same ISA.

System memory 806 may be configured to store program instructions 822 accessible by processor 804. In various embodiments, system memory 806 may be implemented using any suitable memory technology, such as static random access memory (SRAM), synchronous dynamic RAM (SDRAM), nonvolatile/Flash-type memory, or any other type of memory. Additionally, existing camera control data 824 of memory 806 may include any of the information or data structures described above. In some embodiments, program instructions 822 and/or data 824 may be received, sent or stored upon different types of computer-accessible media or on similar media separate from system memory 806 or computer system 802. In various embodiments, some or all of the functionality described herein may be implemented via such a computer system 802.

In one embodiment, I/O interface 808 may be configured to coordinate I/O traffic between processor 804, system memory 806, and any peripheral devices in the device, including network interface 812 or other peripheral interfaces, such as input/output devices 814. In some embodiments, I/O interface 808 may perform any necessary protocol, timing or other data transformations to convert data signals from one component (e.g., system memory 806) into a format suitable for use by another component (e.g., processor 804). In some embodiments, I/O interface 808 may include support for devices attached through various types of peripheral buses, such as a variant of the Peripheral Component Interconnect (PCI) bus standard or the Universal Serial Bus (USB) standard, for example. In some embodiments, the function of I/O interface 808 may be split into two or more separate components, such as a north bridge and a south bridge, for example. Also, in some embodiments some or all of the functionality of I/O interface 808, such as an interface to system memory 806, may be incorporated directly into processors 804.

Network interface 812 may be configured to allow data to be exchanged between computer system 802 and other devices attached to a network 826 (e.g., carrier or agent devices) or between nodes of computer system 802. Network 826 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 812 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output device(s) 814 may, in some embodiments, include one or more display terminals, keyboards, keypads, touchpads, scanning devices, voice or optical recognition devices, or any other devices suitable for entering or accessing data by one or more computer systems 802. Multiple input/output devices 814 may be present in computer system 802 or may be distributed on various nodes of computer system 802. In some embodiments, similar input/output devices may be separate from computer system 802 and may interact with one or more nodes of computer system 802 through a wired or wireless connection, such as over network interface 812.

Those skilled in the art will appreciate that computer system 802 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 802 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 802 may be transmitted to computer system 802 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
a lens group comprising one or more lens elements;
an image sensor;
an actuator for moving the image sensor relative to the lens group; and
a flexure-circuit hybrid structure, comprising:
a plurality of layers stacked in a first direction that is orthogonal to an image plane defined at the image sensor, wherein the plurality of layers comprises:
a flexure portion for suspending the image sensor from a stationary structure of the camera and for allowing motion of the image sensor enabled by the actuator; and
a flex circuit portion for conveying electrical signals between the flexure portion and one or more external components that are external to the camera, wherein the flex circuit portion extends from the flexure portion in a second direction that is parallel to the image plane;
wherein the flexure portion and the flex circuit portion share multiple layers of the plurality of layers.

2. The camera of claim 1, wherein the multiple layers that are shared by the flexure portion and the flex circuit portion comprise a conductive layer.

3. The camera of claim 2, wherein the multiple layers that are shared by the flexure portion and the flex circuit portion further comprise:
a dielectric layer; and
an adhesion layer.

4. The camera of claim 3, wherein the dielectric layer and the adhesion layer are positioned, in the first direction orthogonal to the image plane, between the conductive layer and another conductive layer.

5. The camera of claim 3, wherein:
the conductive layer comprises copper;
the dielectric layer comprises polyimide; and
the adhesion layer comprises chromium.

6. The camera of claim 2, wherein:
the flexure portion further comprises:
a base layer adjacent the conductive layer; and
the flex circuit portion further comprises:
a coverlay layer adjacent the conductive layer; and
an electromagnetic interference (EMI) shield layer adjacent the coverlay layer.

7. The camera of claim 2, wherein the flexure portion comprises:
an inner frame fixedly coupled with the image sensor;
an outer frame fixedly coupled with the stationary structure of the camera; and
one or more flexure arms that are connected to the inner frame and to the outer frame;
wherein the conductive layer comprises electrical traces on at least a portion of the one or more flexure arms, and wherein the electrical traces are configured to convey electrical signals between the inner frame and the outer frame.

8. The camera of claim 1, wherein:
the one or more lens elements define an optical axis; and
the actuator is configured to move the image sensor in at least one direction parallel to the optical axis and in directions orthogonal to the optical axis.

9. The camera of claim 8, wherein the actuator comprises:
a voice coil motor (VCM) actuator, comprising:
one or more magnets; and
one or more coils that electromagnetically interact with the one or more magnets to produce Lorentz forces that move the image sensor.

10. A device, comprising:
one or more processors;
memory storing program instructions executable by the one or more processors to control operations of a camera; and the camera, comprising:
a lens group comprising one or more lens elements;
an image sensor;
an actuator for moving the image sensor relative to the lens group; and
a flexure-circuit hybrid structure, comprising:
a plurality of layers stacked in a first direction that is orthogonal to an image plane defined at the image sensor, wherein the plurality of layers comprises:
a flexure portion for suspending the image sensor from a stationary structure of the camera and for allowing motion of the image sensor enabled by the actuator; and
a flex circuit portion for conveying electrical signals between the flexure portion and one or more external components that are external to the camera, wherein the flex circuit portion extends from the flexure portion in a second direction that is parallel to the image plane;
wherein the flexure portion and the flex circuit portion share multiple layers of the plurality of layers.

11. The device of claim 10, wherein the multiple layers that are shared by the flexure portion and the flex circuit portion comprise a conductive layer.

12. The device of claim 11, wherein:
the conductive layer is a first conductive layer; and
the multiple layers that are shared by the flexure portion and the flex circuit portion further comprise:
a dielectric layer;
an adhesion layer; and
a second conductive layer.

13. The device of claim 12, wherein:
the multiple layers that are shared by the flexure portion and the flex circuit portion further comprise:
the flexure portion further comprises:
a base layer adjacent the second conductive layer; and
the flex circuit portion further comprises:
a coverlay layer adjacent the second conductive layer and adjacent the base layer; and
an electromagnetic interference (EMI) shield layer adjacent the second coverlay layer.

14. The device of claim 12, wherein:
the first conductive layer and the second conductive layer comprise copper;
the dielectric layer comprises polyimide; and
the adhesion layer comprises chromium.

15. The device of claim 11, wherein the flexure portion comprises:
an inner frame fixedly coupled with the image sensor;
an outer frame fixedly coupled with the stationary structure of the camera; and
one or more flexure arms that are connected to the inner frame and to the outer frame; and
wherein the conductive layer comprises electrical traces on at least a portion of the one or more flexure arms, and wherein the electrical traces are configured to convey electrical signals between the inner frame and the outer frame.

16. The device of claim 15, wherein at least one of the electrical traces is routed from the inner frame of the flexure portion to a region of the flex circuit portion that is external to the camera.

17. The device of claim 15, wherein:
the one or more external components comprise a main logic board;
the camera further comprises:
a substrate to which the image sensor is fixedly attached, wherein the substrate is fixedly attached to inner frame of the flexure portion, such that the substrate and the image sensor are movable together with the inner frame; and
the flexure-circuit hybrid structure is configured to convey electrical signals between the substrate and the main logic board.

18. A camera, comprising:
a lens group comprising one or more lens elements;
an image sensor;
an actuator for moving the image sensor relative to the lens group; and
a hybrid structure, comprising:
a plurality of stacked layers, wherein the plurality of stacked layers comprises:
a first portion comprising one or more layers for conveying electrical signals from the image sensor, wherein the first portion allows motion of the image sensor enabled by the actuator; and
a second portion for conveying the electrical signals between the first portion and one or more external components that are external to the camera, wherein the first portion and the second portion share multiple layers of the plurality of layers, and wherein the second portion comprises a flex circuit portion that includes at least one different layer than the first portion.

19. The camera of claim 18, wherein the multiple layers that are shared by the first portion and the second circuit portion comprise:
a first conductive layer;
a dielectric layer;
an adhesion layer; and
a second conductive layer;
wherein the dielectric layer and the adhesion layer are positioned, in a first direction orthogonal to an image plane at the image sensor, between the first conductive layer and the second conductive layer.

20. The camera of claim 18, wherein the first portion comprises:
an inner frame fixedly coupled with the image sensor;
an outer frame fixedly coupled with a stationary structure of the camera;
one or more flexure arms that are connected to the inner frame and to the outer frame; and
a conductive layer comprising electrical traces on at least a portion of the one or more flexure arms, and wherein the electrical traces are configured to convey the electrical signals between the inner frame and the outer frame.

* * * * *